July 31, 1962 — A. TURAK — 3,047,021
FLUID MIXING VALVE
Filed Oct. 1, 1959 — 3 Sheets-Sheet 1

INVENTOR.
ANTHONY TURAK
BY Woodling and Krost,
ATTORNEYS

July 31, 1962 A. TURAK 3,047,021
FLUID MIXING VALVE
Filed Oct. 1, 1959 3 Sheets-Sheet 2

INVENTOR.
ANTHONY TURAK
BY Woodling and Krost,
ATTORNEYS 3,047,021
FLUID MIXING VALVE
Anthony Turak, 11208 Lorain Ave., Cleveland, Ohio
Filed Oct. 1, 1959, Ser. No. 843,702
10 Claims. (Cl. 137—636.1)

The invention relates in general to fluid valves and more particularly to mixing and dispensing valves which may selectively mix and dispense a plurality of fluids.

An object of the invention is to provide a fluid valve for mixing and dispensing fluids which may selectively mix two of three fluids and yet, when the selected two fluids are changed, there is no remainder of the first fluids in the second selected fluids.

Another object of the invention is to provide a fluid mixing valve with easily arranged means for varying the flow in each of the dispensed fluids.

Still another object of the invention is to provide a fluid valve incorporating a positively sealing ball as the valve member sealed by both fluid pressure and spring pressure and opened by a camming action on the ball itself.

Still another object of the invention is to provide a mixing and dispensing valve wherein three separate valve openings communicate with an outlet which is small relative to the size of the valve openings so that the valve outlet is washed clean at the completion of each dispensing operation so that there is practically no intermixing of the mixed selected fluids to be dispensed.

Still another object of the invention is to provide a cam actuated plural valve structure wherein one cam follower overlies another cam follower and a single spring urges both cam followers to an off-condition of the valve.

Other objects and a fuller understanding of the invention may be had by referring to the following description and claims, taken in conjunction with the accompanying drawings, in which:

Figure 1:
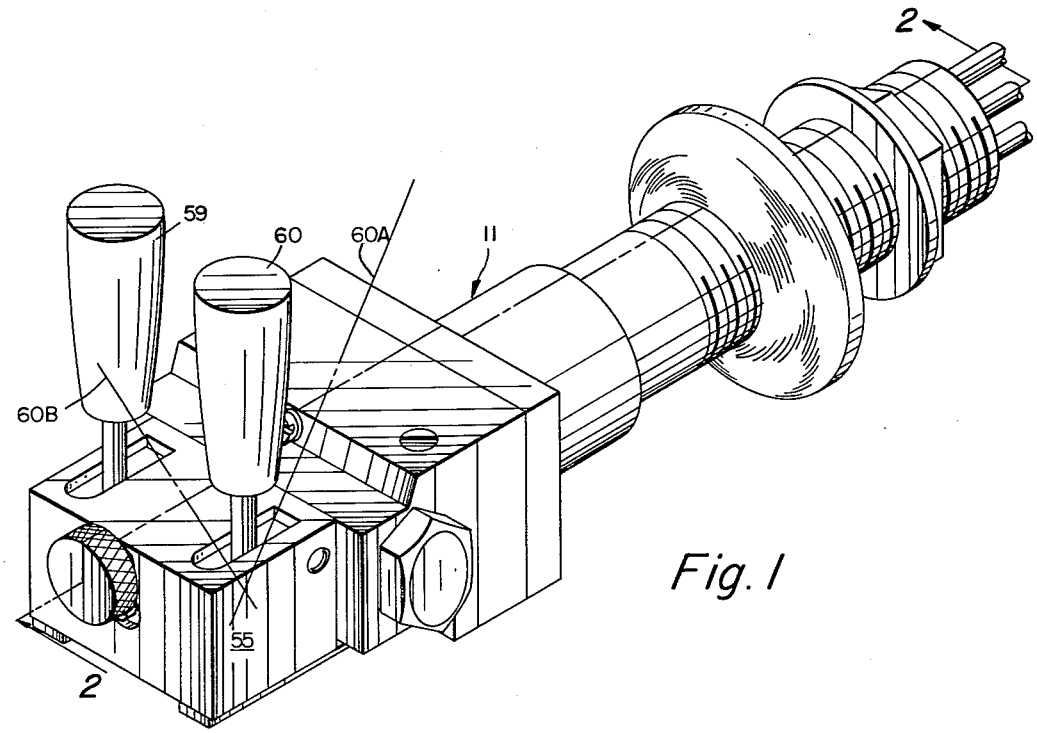
FIGURE 1 is an isometric view of a valve incorporating the invention.

The figures of the drawing show the invention as embodied for purposes of illustration in a valve 11 which includes a body 12 having a longitudinal axis 13. First, second and third chambers 14, 15 and 16 are provided in the body 12 with the first and third chambers 14 and 16 being disposed on a common transverse axis 17 perpendicular to the longitudinal axis 13. First, second and third fluid lines 21, 22 and 23 are connected to the body 12 and lead to the first, second and third chambers 14, 15 and 16, respectively. The body 12 may have a shell 24 fixed thereto to surround the lines 21 to 23 and the shell may be used for mounting the entire valve 11 on a support 25 by means of a nut 26.

The valve 11 may have several uses, but one particular use may be as a mixing and dispensing valve for soda fountains or the like wherein carbonated or soda water may be supplied to the second line 22 and flavoring extracts or syrups may be supplied to the first and third lines 21 and 23. Accordingly, when a syrup from line 21 and the soda water from line 22 are intermixed and dispensed, one beverage is dispensed and a second beverage is dispensed when syrup from line 23 and soda water from line 22 is mixed together.

Figure 5:
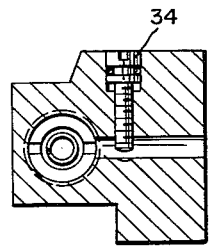
FIGURE 5 is a sectional view on line 5—5 of FIGURE 3.
Figure 6:
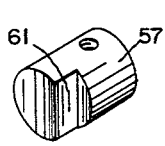
FIGURES 6 and 7 are isometric views of the cam members in the valve.
Figure 7:
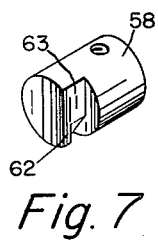
Figure 8:
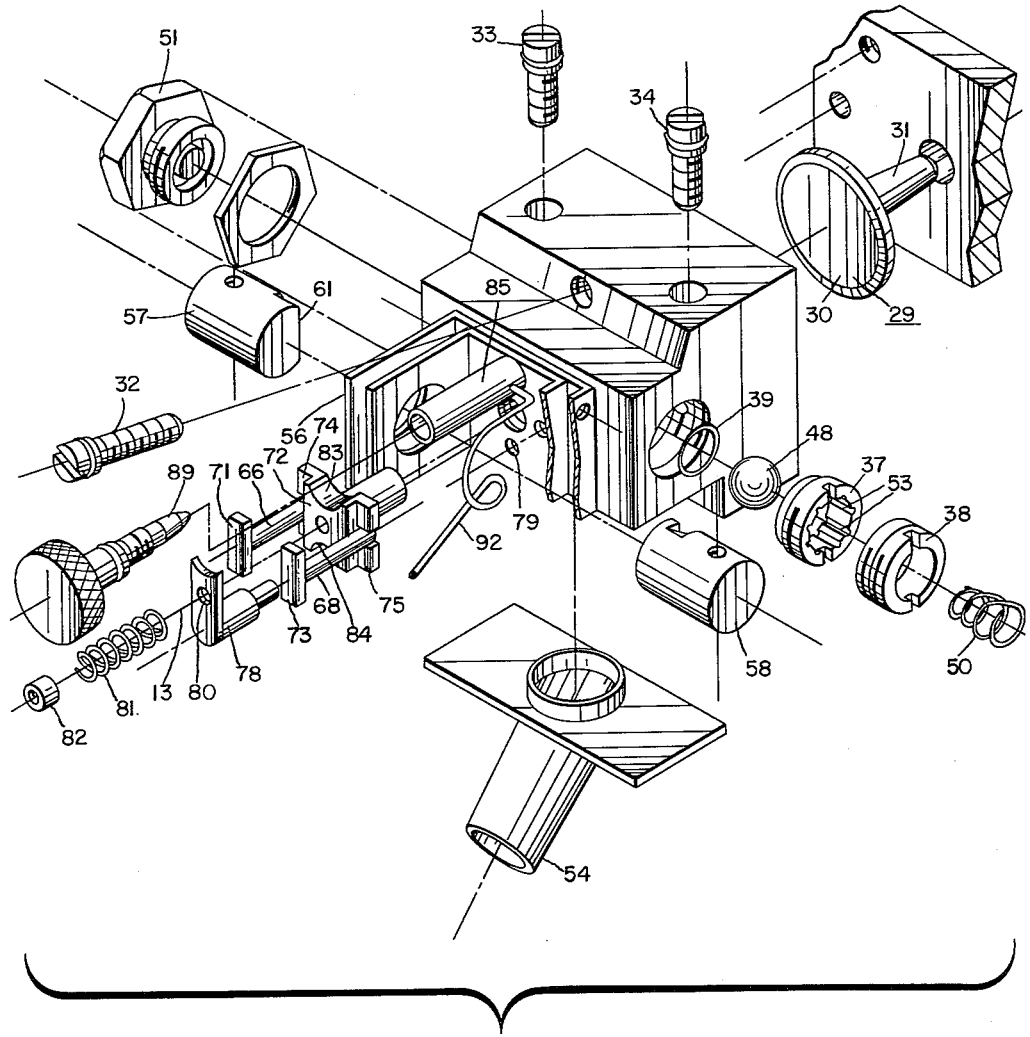
FIGURE 8 is an exploded isometric view of the main part of the valve.

A flow control plug 29 has an enlarged head 30 in the second chamber 15 and a tapered shank 31 disposed in the incoming fluid line 22. An adjusting screw 32 threaded in the body 12 engages the front face of the head 30 to adjustably position the plug 29 so as to adjust the flow through the second line 22 into the second chamber 15. Flow control screws 33 and 34 are threadably mounted in the body 12 and intersect the lines 21 and 23, as shown in FIGURE 5, to control flow of fluid through these lines.

The first and third chambers 14 and 16 are internally threaded and each contains first and second nuts 37 and 38, respectively. These nuts are externally threaded and the first nut 37 axially engages an O-ring seal 39. A vertically disposed cylindrical outlet 42 is provided in the body 12 with the axis of this cylindrical outlet intersecting the longitudinal and transverse axes. First, second and third valve openings 43, 44 and 45, respectively, are provided in the outlet 42 for communication with the first, second and third chambers 14, 15 and 16, respectively. This establishes the first and third valve openings 43 and 45 on opposite sides of the outlet 42 and establishes the second valve opening 44 at the rear of the outlet 42. The O-ring seals 39 in the first and third chambers 14 and 16 are at the valve openings 43 and 45 and the first nuts 37 axially compress the O-ring seals 39 to accomplish two purposes. The first is to make a fluid tight seal between the O-ring seal and the valve opening, and the second is to radially inwardly extrude the O-ring seal so that balls 46 and 48 in the first and third chambers 14 and 16, respectively, will not pass from these chambers into the outlet 42. These balls 46 and 48 are urged into sealing engagement with the O-ring seals 39 by springs 50 held by a threaded cap 51 and also urged by fluid pressure in the lines 21 and 23 behind these balls. The balls 46 and 48 may be considered first and third valve members and a second valve member 49 is provided in the second valve opening 44. Axial passageways 53 are provided in the first nuts 37 and the second nuts 38 act as lock nuts to securely lock the first nuts 37 in position.

A frame 56 is fixed on the front of the body 12 and journals first and second cam members 57 and 58 on a common transverse axis, generally intersecting the longitudinal axis 13. A discharge spout 54 may be directly connected to the bottom of the outlet 42 and held in place by a cap 55 fastened to the frame 56. First and second handles 59 and 60 are connected to these cam members 57 and 58, respectively, to arcuately move these cam members. The first cam member 57 has a first cam surface 61 and the second cam member 58 has second and third cam surfaces 62 and 63, respectively. First, second and third valve stems 66, 67 and 68 are slidably mounted in the body 12 parallel to the longitudinal axis 13 and the second valve stem 67 is directly connected to the second valve member 49. This second valve stem 67 has a forwardly facing shoulder 69. First, second and third cam followers 71, 72 and 73, respectively, are provided for cooperation with the cam members 57 and 58 and the first and third cam followers 71 and 73 are connected to the forward ends of the first and third valve stems 66 and 68. The second cam follower 72 slidably surrounds the second valve stem 67 and abuts the forwardly facing shoulder 69. The second cam follower 72 has recesses 74 and 75 to receive the first and third cam followers 71 and 73 so that these cam followers may overlie the second cam follower 72 and present a single plane forward surface.

A bracket 78 is mounted in a hole 79 in the body 12 and an aperture 80 in this bracket receives the second valve stem 67. This bracket 78 provides an abutment for a cam compression spring 81 which surrounds the second valve stem 67 and is held in place by a nut 82. This compression spring thus urges the second valve member 47 outwardly and through the shoulder 69 urges the second cam follower 72 forwardly against the cam members 57 and 58. Also, since the first and third cam followers 71 and 73 overlie the second cam follower 72, these latter cam followers are also urged forwardly and into engagement with the cam members 57 and 58.

The second cam follower 72 has curved side recesses 83 and 84. The side recess 84 slidably engages the bracket 78 and the recess 83 slidably engages a tube 85. This non-circular configuration of the second cam follower 72 establishes non-rotative sliding movement of this second cam follower 72. Also, the fact that the first and third cam followers 71 and 73 are rectangular, as are the recesses 74 and 75, establishes non-rotative sliding movements of the cam followers 71 and 73.

The rear end of the valve stems 66 and 68 extend into the outlet 42 and engage a small arc of the balls 46 and 48 to actuate these balls to unseat them from the O-ring seals 39.

Figure 2:
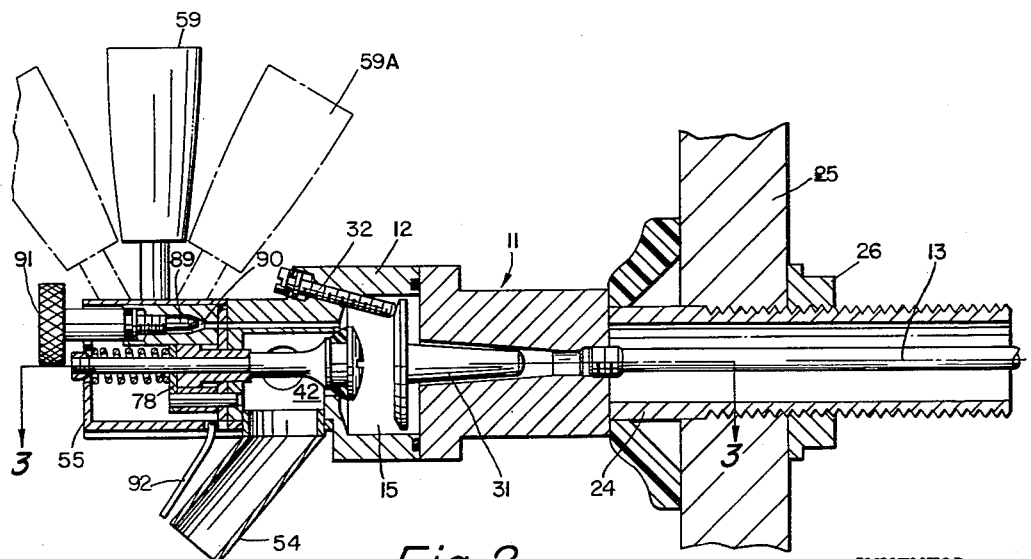
FIGURE 2 is a longitudinal sectional view of the valve of FIGURE 1.
Figure 3:
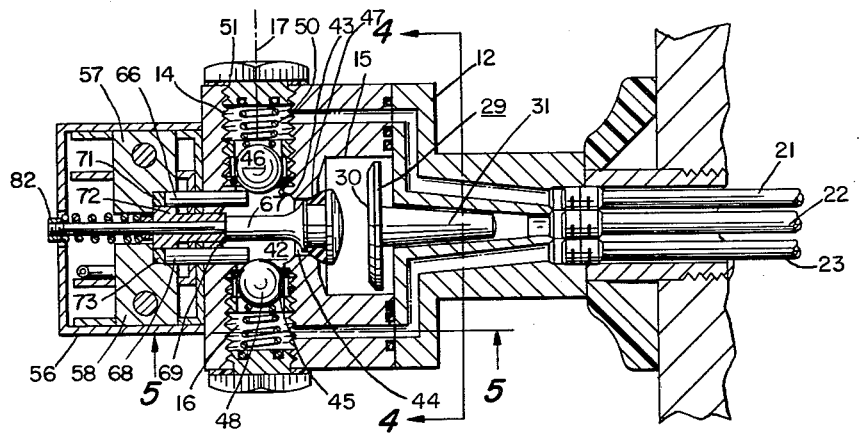
FIGURE 3 is a sectional view on line 3—3 of FIGURE 2.
Figure 4:
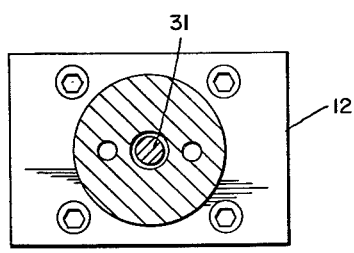
FIGURE 4 is a sectional view on line 4—4 of FIGURE 3.

The cam members 57 and 58 control movement of the valve stems 66, 67 and 68 and both cam members have a neutral position, as shown in FIGURES 1, 3, 6, 7 and 8. The cam members 57 and 58 are in a neutral position when the respective handles 59 and 60 are perpendicular to the longitudinal axis 13. The first cam member 57 and first handle 59 have a first operative position when the handle is moved to the first arcuate position 59A, as shown in FIGURE 2, for example, this may be a 30° arcuate movement to the rear. The second cam member 58 has a first operative position when the handle 60 is moved to the rear to the position 60A, as shown in FIGURE 1, and a second operative position when this handle 60 is moved arcuately forwardly to the position 60B. When the handle 59 is moved to the rear to the first position 59A the first cam surface 61 actuates both the first and second cam followers 71 and 72 to the rear. This opens both the first and second valve members 46 and 47. The second valve member 47 is directly actuated and the first valve member or ball 46 is cammingly actuated to the unseated position by rearward movement of the first valve stem 66. When the second cam member 58 is moved to the first operative position, as shown by the handle at the position 60A, the second cam surface 62 is constructed to engage only the second cam follower 72; hence, only the second valve member 47 is opened. When the handle 60 is moved to the second operative position 60B, the third cam surface 63 engages and actuates both the second and third cam followers 72 and 73 to open both the second and third valve members 47 and 48. When the handles 59 and 60 are returned to the neutral position, the cam spring 81 returns all cam followers 71 to 73 to the neutral or forwardly-actuated position, and, as a result, the first and third valve stems 66 and 68 are forcibly pulled away from the balls 46 and 48. This assures that these ball valves 46 and 48 will be closed by action of the spring 50 and the fluid pressure and assures that these first and third valve members will not be locked in an open position by the valve stems 66 and 68 going past the center of these balls.

The tube 85 houses a fourth valve member 89 which has a valve opening 90 communicating with the second chamber 15. The fourth valve member 89 may be in the form of a taper or needle valve actuated by a rotatable handle 91 at the front of the frame 56. Just subsequent to the valve opening 90 a discharge tube 92 extends radially and forwardly to a position just forward of the discharge spout 54. Upon opening this fourth valve member 89 fluid, for example, soda water, may be dispensed out the discharge tube 92 from the second chamber 15, and thus, this fourth valve member acts as a bypass for the second valve member 47. This fourth valve member 89 may dispense a high velocity concentrated stream or jet which is often used for mixing ice cream sodas or the like.

In operation, the handle 59 may be actuated either forwardly or rearwardly and, in either event, the first cam surface 61 actuates both the first and second valve members 46 and 47 to simultaneously dispense fluids from the first and second lines 21 and 22. In the aforementioned example, this could be flavoring extracts or syrup supplied to the first and third lines 21 and 23 plus carbonated or soda water supplied to the second line 22 to mix them together in the cylindrical outlet 42 and to be simultaneously dispensed from the discharge spout 54. A second flavored beverage would be dispensed with movement of the handle 60 to the second arcuate position 60B, whereat the third cam surface 63 actuates both cam followers 72 and 73 to open the two valve members 77 and 78; thus, a second syrup would be mixed with soda water in the outlet 42 and dispensed. Because the outlet 42 is quite small relative to the diameters of the valve openings 43 to 45 and because these valve openings are generally at right angles to each other, this means that a very minimum volume is provided in the outlet 42 so that this outlet 42 is washed clean at the termination of each dispensing action. This assures that the next dispensing action, if of a different combination of fluids from the previous dispensing action, will not be contaminated by the previously dispensed fluids. As the handle 60 is moved to the first operative position 60A, the second cam surface 62 is constructed to actuate only the second cam follower 72; hence, only the second valve member 47 is actuated and only fluid, such as soda water, is dispensed from the second line 22.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A plural mixing and dispensing valve comprising, in combination, a body having a longitudinal axis, first, second and third fluid lines connected to said body, an outlet in said body, first, second and third valve openings in said outlet communicating with said first, second and third lines, respectively, said first and third valve openings being on opposite sides of said outlet and said second valve opening being in the rear of said outlet, first, second and third valve members seatable in said first, second and third valve openings, respectively, spring means urging closed said valve members, first, second and third valve stems aligned parallel to the longitudinal axis of said body and slidable in said body, the rearward ends of said first and third valve stems being disposed in said outlet to cammingly engage said first and third valve members to unseat same upon rearward movement of said first and third valve stems, said second valve member being operably connected to said second valve stem and seating in said second valve opening upon forward axial movement of said second valve stem, first and second cam members journalled on the front of said dispensing valve, a first cam surface on said first cam member, second and third cam surfaces on said cam member, first, second and third cam followers, complementary surfaces on said second cam follower and said body to permit non-rotative sliding movements of said second cam follower parallel to said longitudinal axis, complementary surfaces on said first and second and said second and third cam followers to permit non-rotative relative sliding movements of said first and second and said second and third cam followers parallel to said longitudinal axis, said first and third cam followers operably connected to said first and third valve stems, respectively, and overlying said second cam follower, a forwardly facing shoulder on said second valve stem, said second cam follower engageable with said forwardly facing shoulder, each of said cam members having a neutral position and a first arcuate position and said second cam member having a second arcuate position on the other side of neutral, said first cam surface actuating both said first and second cam followers, said second cam surface actuating only said second cam follower, and said third cam surface actuating both said second and third cam followers.

2. A plural mixing and dispensing valve comprising, in combination, a body, first, second and third fluid lines connected to said body, first, second and third chambers in said body communicating with said first, second and third lines, respectively, an outlet in said body having a downwardly directed axis, first, second and third valve openings in said outlet communicating with said first, second and third chambers, respectively, said first and third valve openings being on opposite sides of said outlet and said second valve opening being in the rear of said outlet, first, second and third valve members seatable in said first, second and third valve openings, respectively, said first and third valve members each comprising a ball, an O-ring seal in each said first and third valve openings for seating engagement with said balls, hollow externally threaded nuts in each said first and third chambers, said balls being disposed in said nuts, axial passageways in each of said nuts for fluid communication past said balls, said nuts axially engaging said O-ring seals to establish sealing engagement of said O-ring seals with said balls, a spring in each of said first and third chambers urging said balls toward sealing engagement with said O-rings and a spring urging closed said second valve member, first, second and third valve stems slidable in said body, said first and third valve stems being disposed in said outlet to engage a small arc of said balls to unseat same upon rearward movement of said first and third valve stems, said second valve member being actuated by said second valve stem and seating in said second valve opening upon forward axial movement of said second valve stem, cam means to selectively actuate said first, second and third valve stems, a fourth chamber in said body communicating with said second chamber and having an outlet from said body, a fourth valve member seatable in said fourth chamber, and means to actuate said fourth valve member and acting as a bypass for said second valve member.

3. A plural mixing and dispensing valve comprising, in combination, a body, first and second fluid lines connected to said body, first and second chambers in said body communicating with said first and second lines, respectively, an outlet in said body having a downwardly directed axis, first and second valve openings in said outlet communicating with said first and second chambers, respectively, said first and second valve openings being disposed generally at right angles to each other in said outlet, first and second valve members seatable in said first and second valve openings, respectively, said first valve member comprising a ball, an O-ring seal in said first valve opening for seating engagement with said ball, a hollow externally threaded nut in said first chamber, said ball being disposed in said nut, axial passageways in said nut for fluid communication past said ball, said nut axially engaging said O-ring seal to establish sealing engagement of said O-ring seal with said ball, a spring in said first chamber urging said ball toward sealing engagement with said O-ring and a spring urging closed said second valve member, first and second valve stems slidable in said body, said first valve stem being disposed in said outlet to engage a small arc of said ball to unseat same upon rearward movement of said first valve stem, said second valve member being actuated by said second valve stem and seating in said second valve opening upon forward axial movement of said second valve stem, and cam means to selectively actuate said first and second valve stems.

4. A plural mixing and dispensing valve comprising, in combination, a body, first, second and third fluid lines connected to said body, first, second and third chambers in said body communicating with said first, second and third lines, respectively, an outlet in said body having a downwardly directed axis, first, second and third valve openings in said outlet communicating with said first, second and third chambers, respectively, said first and third valve openings being on opposite sides of said outlet and said second valve opening being in the rear of said outlet, first, second and third valve members seatable in said first, second and third openings, respectively, said first and third valve members each comprising a ball, an O-ring seal in each said first and third valve openings for seating engagement with said balls, hollow externally threaded nuts in each said first and third chambers, said balls being disposed in said nuts, axial passageways in each of said nuts for fluid communication past said balls, said nuts axially engaging said O-ring seals to establish sealing engagement of said O-ring seals with said balls, a spring in each of said first and third chambers urging said balls toward sealing engagement with said O-rings and a spring urging said second valve member, first, second and third valve stems slidable in said body, said first and third valve stems being disposed in said outlet to engage a small arc of said balls to unseat same upon rearward movement of said first and third valve stems, said second valve member being actuated by said second valve stem and seating in said second valve opening upon forward axial movement of said second valve stem, and cam means to selectively actuate said first, second and third valve stems.

5. A plural mixing and dispensing valve comprising, in combination, a body having a longitudinal axis, first, second and third fluid lines connected to said body, first, second and third chambers in said body communicating with said first, second and third lines, respectively, volume control means to control the flow of fluid through said lines, an outlet in said body having a downwardly directed axis, first, second and third valve openings in said outlet communicating with said first, second and third valve chambers, respectively, said first and third valve openings being on opposite sides of said outlet and said second valve opening being in the rear of said outlet, first, second and third valve members seatable in said first, second and third valve openings, respectively, said first and third valve members each comprising a ball, an O-ring seal in each said first and third valve openings for seating engagement with said balls, hollow externally threaded nuts in each said first and third chambers, said balls being disposed in said nuts, axial passageways in each of said nuts for fluid communication past said balls, said nuts axially engaging said O-ring seals to establish sealing engagement of said O-ring seals with said balls, a spring in each of said first and third chambers urging said balls toward sealing engagement with said O-rings and a spring urging closed said second valve members, first, second and third valve stems aligned parallel to the longitudinal axis of said body and slidable in said body, the rearward ends of said first and third valve stems being disposed in said outlet to engage a small arc of said balls to unseat same upon rearward movement of said first and third valve stems, said second valve member being actuated by said second valve stem and seating in said second valve opening upon forward axial movement of said second valve stem, and cam means to selectively actuate said first, second and third valve stems.

6. A plural mixing and dispensing valve comprising, in combination, a body having a longitudinal axis, first, second and third fluid lines connected to said body, first, second and third chambers in said body communicating with said first, second and third lines, respectively, said first and third chambers being on a common axis perpendicular to said longitudinal axis and being internally threaded, volume control means in said second chamber and in said first and third lines to control the flow of fluid through said lines, an outlet in said body having a vertical axis generally perpendicular to said longitudinal and common axes, first, second and third valve openings in said outlet communicating with said first, second and third chambers, respectively, said first and third valve openings being on opposite sides of said outlet and said second valve opening being in the rear of said outlet, first, second and third valve members seatable in said first, second and third valve openings, respectively, said first and third valve members each comprising a ball, an O-ring seal in each said first and third valve openings for seating engagement with said balls, first and second hollow externally threaded nuts in each said first and third chambers, said balls being disposed in said first nuts, axial passageways in each of said first nuts for fluid communication past said balls, said second nuts threaded into said first and third chambers as lock nuts against said first nuts, a spring in each of said first and third chambers urging said balls toward sealing engagement with said O-rings, first, second and third valve stems slidable in said body, the rearward ends of said first and third valve stems beind disposed in said outlet to engage a small arc of said balls to unseat same upon rearward movement of said first and third valve stems, said second valve member being actuated by said second valve stem and seating in said second valve opening upon forward axial movement of said second valve stem, cam means having first, second and third cam surfaces, first, second and third cam followers operably connected to said first, second and third valve stems, respectively, and acted on by said first, second and third cam surfaces, and said first and third cam followers overlying said second cam follower for concurrent actuation of said second cam follower upon actuation of either of said first and third cam followers.

7. A plural mixing and dispensing valve comprising, in combination, a body having a longitudinal axis, first, second and third fluid lines connected to said body, first, second and third chambers in said body communicating with said first, second and third lines, respectively, said first and third chamber being on a common axis perpendicular to said longitudinal axis and being internally threaded, volume control means in said second chamber and in said first and third lines to control the flow of fluid through said lines, a cylindrical outlet in said body having a vertical axis generally perpendicular to said longitudinal and common axes, a downwardly directed spout connected to said outlet, first, second and third valve openings in said outlet communicating with said first, second and third chambers, respectively, said first and third valve openings being on opposite sides of said outlet and said second valve opening being in the rear of said outlet, first, second and third valve members seatable in said first, second and third valve openings, respectively, said first and third valve members each comprising a ball, an O-ring seal in each said first and third valve openings for seating engagement with said balls, first and second hollow externally threaded nuts in each said first and third chambers, said balls being disposed in said first nuts, axial passageways in each of said first nuts for fluid communication past said balls, said first nuts axially compressing said O-ring seals to cause them to extrude radially inwardly to effect sealing engagement with said balls, said second nuts threaded into said first and third chambers as lock nuts against said first nuts, a spring in each of said first and third chambers urging said balls toward sealing engagement with said O-rings, said valve openings being large relative to the size of said outlet, first, second and third valve stems aligned parallel to the longitudinal axis of said body and slidable in said body, the rearward ends of said first and third valve stems being disposed in said outlet to engage a small arc of said balls to unseat same upon rearward movement of said first and third valve stems, said second valve member being on said second valve stem and seating in said second valve opening upon forward axial movement of said second valve stem, first and second cam members journalled on the front of said dispensing valve, a first cam surface on said first cam member, second and third cam surfaces on said second cam member, first, second and third cam followers, said first and third cam followers operably connected to said first and third valve stems, respectively, and overlying said second cam follower, a forwardly facing shoulder on said second valve stem, said second cam follower engageable with said forwardly facing shoulder, and a spring acting between said body and said second valve stem to urge closed said second valve member and to urge said second cam follower forwardly against said cam members and against said first and third cam followers.

8. A plural mixing and dispensing valve comprising, in combination, a body having a longitudinal axis, first, second and third fluid lines connected to said body, an outlet in said body having a downwardly directed axis generally perpendicular to the longitudinal axis of said body, first, second and third valve openings in said outlet communicating with said first, second and third lines, respectively, said first and third valve openings being on opposite sides of said outlet and said second valve opening being in the rear of said outlet, first, second and third valve members seatable in said first, second and third valve openings, respectively, spring means urging closed said valve members, first, second and third valve stems aligned parallel to the longitudinal axis of said body and slidable in said body, the rearward ends of said first and third valve stems being disposed in said outlet to cammingly engage said first and third valve members to unseat same upon rearward movement of said first and third valve stems, said second valve member being on said second valve stem and seating in said second valve opening upon forward axial movement of said second valve stem, first and second cam members journalled on a common transverse axis on the front of said dispensing valve, first and second handles to arcuately move said first and second cam members, respectively, a first cam surface on said first cam member, second and third cam surfaces on said second cam member, first, second and third cam followers, said first and third cam followers operably connected to said first and third valve stems, respectively, and overlying said second cam follower, a forwardly facing shoulder on said second valve stem, said second cam follower slidable on said second valve stem and engageable with said forwardly facing shoulder, each of said cam members having a neutral position and a first arcuate position and said second cam member having a second arcuate position on the other side of neutral, said first cam surface actuating both said first and second cam followers, said second cam surface actuating only said second cam follower, and said third cam surface actuating both said second and third cam followers, whereby when said first cam member is moved to said first arcuate position both said first and second valve stems are actuated inwardly to open the first and second valve members to dispense fluids from the first and second line, whereby when said second cam member is moved to said first arcuate position only said second valve stem is actuated inwardly to open said second valve member to dispense fluid from said second line, and whereby when said second cam member is moved to said second arcuate position said second and third valve stems are actuated inwardly to open said second and third valve members to dispense fluids from said second and third lines.

9. A plural mixing and dispensing valve comprising, in combination, a body having a longitudinal axis, first, second and third fluid lines connected to said body, first, second and third chambers in said body communicating with said first, second and third lines, respectively, said first and third chambers being on a common axis perpendicular to said longitudinal axis, volume control means to control the flow of fluid through each of said lines, a cylindrical outlet in said body having a vertical axis generally perpendicular to said longitudinal and common axes, a downwardly directed spout connected to said outlet, first, second and third valve openings in said outlet communicating with said first, second and third chambers, respectively, said first and third valve openings being on opposite sides of said outlet and said second valve opening being in the rear of said outlet, first, second and third valve members seatable in said first, second and third valve openings, respectively, a spring in each of said first and third chambers urging said first and third valve members closed, first, second and third valve stems aligned parallel to the longitudinal axis of said body and slidable in said body, the rearward ends of said first and third valve stems being disposed in said outlet to cammingly engage said first and third valve members to unseat same upon rearward movement of said first and third valve stems, said second valve member being on said second valve stem and seating in said second valve opening upon forward axial movement of said second valve stem, first and second cam members journalled on a common transverse axis on the front of said dispensing valve, first and second handles to arcuately move said first and second cam members, respectively, a first cam surface on said first cam member, second and third cam surfaces on said second cam member, first, second and third cam followers, said first and third cam followers operably connected to said first and third valve stems, respectively, and overlying said second cam follower a forwardly facing shoulder on said second valve stem, said second cam follower slidable on said second valve stem and engageable with said forwardly facing shoulder, a spring surrounding said second valve stem and acting between said body and said second valve stem to urge closed said second valve member and to urge said second cam follower forwardly against said cam members and against said first and third cam followers, each of said cam members having a neutral position and a first arcuate position and said second cam member having a second arcuate position on the other side of neutral, said first cam surface engaging and operating both said first and second cam followers, said second cam surface engaging and operating only said second cam follower, and said third cam surface engaging and operating both said second and third cam followers, whereby when said first cam member is moved to said first arcuate position said first cam surface actuates both said first and second valve stems inwardly to simultaneously open the first and second valve members to simultaneously dispense fluids from the first and second lines, whereby when said second cam member is moved to said first arcuate position said second cam surface actuates only said second valve stem inwardly to open said second valve member to dispense fluid from said second line, and whereby when said second cam member is moved to said second arcuate position said third cam surface actuates both said second and third valve stems inwardly to simultaneously open said second and third valve members to simultaneously dispense fluids from said second and third lines.

10. A plural mixing and dispensing valve comprising, in combination, a body having a longitudinal axis, first, second and third fluid lines connected to said body, first, second and third chambers in said body communicating with said first, second and third lines, respectively, said first and third chambers being on a common axis perpendicular to said longitudinal axis and being internally threaded, volume control means in said second chamber and in said first and third lines to control the flow of fluid through said lines, a cylindrical outlet in said body having a vertical axis generally perpendicular to said longitudinal and common axes, a downwardly directed spout connected to said outlet, first, second and third valve openings in said outlet communicating with said first, second and third chambers, respectively, said first and third valve openings being on opposite sides of said outlet and said second valve opening being in the rear of said outlet, first, second and third valve members seatable in said first, second and third valve openings, respectively, said first and third valve members each comprising a ball, an O-ring seal in each said first and third valve openings for seating engagement with said balls, first and second hollow externally threaded nuts in each said first and third chambers, said balls being disposed in said first nuts, axial passageways in each of said first nuts for fluid communication past said balls, said first nuts axially compressing said O-ring seals to cause them to extrude radially inwardly to effect sealing engagement with said balls, said second nuts threaded into said first and third chambers as lock nuts against said first nuts, a spring in each of said first and third chambers urging said balls toward sealing engagement with said O-rings, said valve openings being large relative to the size of said outlet, first, second and third valve stems aligned parallel to the longitudinal axis of said body and slidable in said body, the rearward ends of said first and third valve stems being disposed in said outlet to engage a small arc of said balls to unseat same upon rearward movement of said first and third valve stems, said second valve member being on said second valve stem and seating in said second valve opening upon forward axial movement of said second valve stem, first and second cam members journalled on a common transverse axis on the front of said dispensing valve, first and second handles to arcuately move said first and second cam members, respectively, a first cam surface on said first cam member, second and third cam surfaces on said second cam member, first, second and third cam followers, said first and third cam followers directly connected to said first and third valve stems, respectively, and overlying said second cam follower, a forwardly facing shoulder on said second valve stem, said second cam follower slidable on said second valve stem and engageable with said forwardly facing shoulder, a spring surrounding said second valve stem and acting between said body and said second valve stem to urge closed said second valve member and to urge said second cam follower forwardly against said cam members and against said first and third cam followers, each of said cam members having a neutral position and a first arcuate position and said second cam member having a second arcuate position on the other side of neutral, said first cam surface engaging and operating both said first and second cam followers, said second cam surface engaging and operating only said second cam follower, and said third cam surface engaging and operating both said second and third cam followers, whereby when said first cam member is moved to said first arcuate position said first cam surface actuates both said first and second valve stems inwardly to simultaneously open the first and second valve members to simultaneously dispense fluids from the first and second lines, whereby when said second cam member is moved to said first arcuate position said second cam surface actuates only said second valve stem inwardly to open said second valve member to dispense fluid from said second line, and whereby when said second cam member is moved to said second arcuate position said third cam surface actuates both said second and third valve stems inwardly to simultaneously open said second and third valve members to simultaneously dispense fluids from said second and third lines.

References Cited in the file of this patent

UNITED STATES PATENTS

| | | |
|---|---|---|
| 1,669,651 | Bloch | May 15, 1928 |
| 1,915,553 | Shindel | June 27, 1933 |
| 2,296,135 | Baston | Sept. 15, 1942 |
| 2,896,663 | Mena | July 28, 1959 |
| 2,921,605 | Booth | Jan. 19, 1960 |